US012632492B2

(12) United States Patent
Srinivasan et al.

(10) Patent No.: US 12,632,492 B2
(45) Date of Patent: May 19, 2026

(54) AUTOMATIC EMBEDDING OF ADDITIONAL CONTENT TO ARTICLES

(71) Applicant: Microsoft Technology Licensing, LLC, Redmond, WA (US)

(72) Inventors: Prithvishankar Srinivasan, Seattle, WA (US); Aman Singhal, Sammamish, WA (US); Marcelo Medeiros De Barros, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 17/200,332

(22) Filed: Mar. 12, 2021

(65) Prior Publication Data

US 2022/0222289 A1     Jul. 14, 2022

Related U.S. Application Data

(60) Provisional application No. 63/137,489, filed on Jan. 14, 2021.

(51) Int. Cl.
G06F 16/438 (2019.01)
G06F 16/2457 (2019.01)
(Continued)

(52) U.S. Cl.
CPC ...... G06F 16/438 (2019.01); G06F 16/24578 (2019.01); G06F 16/45 (2019.01);
(Continued)

(58) Field of Classification Search
CPC .. G06F 16/24578; G06F 16/438; G06F 16/45; G06F 16/838
See application file for complete search history.

(56) References Cited

U.S. PATENT DOCUMENTS 10,594,757 B1 *  3/2020  Shevchenko ........... G06F 16/27
11,176,180 B1 *  11/2021 Gudur ................. G06F 16/3344
(Continued)

OTHER PUBLICATIONS

"International Search Report and Written Opinion Issued in PCT Application No. PCT/US2021/061305", Mailing Date: Mar. 2, 2022, 14 Pages.
(Continued)

*Primary Examiner* — Kavita Stanley
*Assistant Examiner* — Jedidiah P Ferrer
(74) *Attorney, Agent, or Firm* — Ray Quinney & Nebeker P.C.

(57) ABSTRACT

The present disclosure relates to systems, devices, and methods for identifying additional content for an article. The systems, devices, and methods may identify a domain for the articles and content and may use machine learning models to classify the articles and the content into categories using smart tags for the domain. The systems, devices, and methods may convert the articles and the content into document vectors using a pre-trained domain specific language model and generate a relevance score for the articles and the content using the document vectors. The systems, devices, and methods may generate a list of predicted matches that includes content that is similar to the article based on the relevance score. The systems, devices, and methods may filter the list of predicted matches based on a temporal proximity to generate a list of additional content for the article.

19 Claims, 6 Drawing Sheets

(51) Int. Cl.

| | | |
|---|---|---|
| *G06F 16/45* | (2019.01) | |
| *G06F 16/838* | (2019.01) | |
| *G06F 40/205* | (2020.01) | |
| *G06N 20/00* | (2019.01) | |

(52) U.S. Cl.

CPC .......... *G06F 16/838* (2019.01); *G06F 40/205* (2020.01); *G06N 20/00* (2019.01)

(56) References Cited

U.S. PATENT DOCUMENTS

| | | | | |
|---|---|---|---|---|
| 2001/0034743 | A1* | 10/2001 | Thomas ................ | G06F 16/958 |
| | | | | 715/255 |
| 2005/0117886 | A1* | 6/2005 | Kang ................. | H04N 21/4884 |
| | | | | 386/326 |
| 2007/0250901 | A1* | 10/2007 | McIntire ............. | G06F 16/7837 |
| | | | | 715/203 |
| 2008/0021860 | A1* | 1/2008 | Wiegering ........ | G06F 16/24578 |
| | | | | 707/999.001 |
| 2009/0112844 | A1* | 4/2009 | Oro ....................... | G06F 16/951 |
| | | | | 707/999.005 |
| 2012/0191692 | A1* | 7/2012 | Wang .................... | G06F 16/958 |
| | | | | 707/758 |
| 2012/0278337 | A1* | 11/2012 | Acharya .......... | G06F 16/24578 |
| | | | | 707/E17.101 |
| 2013/0159251 | A1* | 6/2013 | Skrenta ............... | G06F 16/2282 |
| | | | | 707/612 |
| 2015/0112963 | A1* | 4/2015 | Mojtahedi ........... | G06F 16/9537 |
| | | | | 707/711 |
| 2015/0193537 | A1* | 7/2015 | Cierniak ............. | G06F 16/9535 |
| | | | | 707/706 |
| 2016/0104069 | A1* | 4/2016 | Garg ........................ | G06N 5/00 |
| | | | | 706/11 |
| 2016/0259790 | A1* | 9/2016 | Mashiach ........... | G06F 16/9535 |
| 2016/0359988 | A1* | 12/2016 | Kazerani ............. | G06F 16/9537 |
| 2017/0011092 | A1* | 1/2017 | Huddleston ......... | G06F 16/2455 |
| 2020/0125574 | A1 | 4/2020 | Ghoshal | |
| 2020/0125575 | A1 | 4/2020 | Ghoshal et al. | |
| 2020/0184142 | A1* | 6/2020 | Fernandez-Ruiz .......................... | |
| | | | | G06F 16/9535 |
| 2021/0366022 | A1* | 11/2021 | Maldonado ........ | G06Q 30/0631 |

OTHER PUBLICATIONS

Communication pursuant to Article 94(3) Received in European Patent Application No. 21831409.4, mailed on Oct. 18, 2024, 10 pages.

Summons to attend oral proceedings pursuant to Rule 115(1) Received in European Patent Application No. 21831409.4, mailed on Mar. 21, 2025, 13 pages.

First Office Action Received for Chinese Application No. 202180090614.1, mailed on Dec. 27, 2025, 22 Pages (English Translation Provided).

* cited by examiner

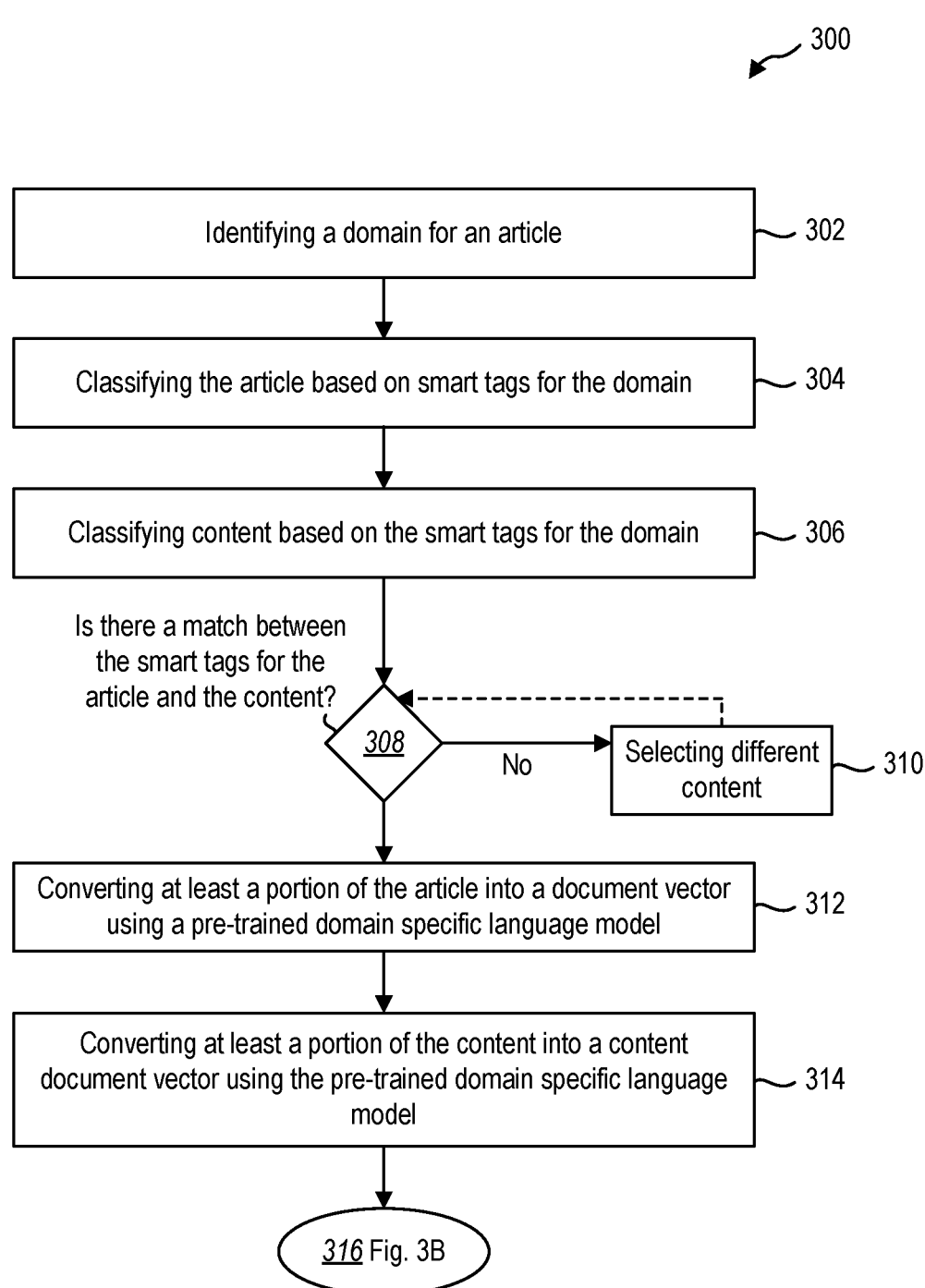

300

| Identifying a domain for an article | ~ 302 |

| Classifying the article based on smart tags for the domain | ~ 304 |

| Classifying content based on the smart tags for the domain | ~ 306 |

Is there a match between
the smart tags for the
article and the content?

308    No →  | Selecting different content | ~ 310 |

| Converting at least a portion of the article into a document vector using a pre-trained domain specific language model | ~ 312 |

| Converting at least a portion of the content into a content document vector using the pre-trained domain specific language model | ~ 314 |

AUTOMATIC EMBEDDING OF ADDITIONAL CONTENT TO ARTICLES

CROSS-REFERENCE TO RELATED APPLICATIONS

This application claims benefit of U.S. Provisional Patent Application Ser. No. 63/137,489, filed Jan. 14, 2021, which is hereby incorporated by reference in its entirety.

BACKGROUND

Users who engage on news feeds or news articles on a regular basis are often interested in watching multimedia content (photos, videos, images) relevant to the news articles. This is prevalent behavior for all kind of articles, such as, sports (highlights), news (interviews, debates), and/or weather (predictions, infographics). Serving multimedia content to users has proven to increase both engagement and revenue. There is a gap where users are not served multimedia content which is directly linked to the topic the users are reading about. Currently, users are being served with recommended videos which may be derived due to high engagement for those particular videos or because the videos are talking about the same market sector, such as, sports or weather. These recommended videos attempt to shift the attention of the users from the topic the users are reading about, resulting in poor engagement from the users.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A user reading an article about a particular event, may want to find additional information about the event. Specifically, the user may want to see images or videos of the event that weren't included in the article. The publisher of the article may not have any images or videos to share, therefore it is beneficial to the user to have visual content provided from other publishers about the same event. As an example, a content provider may identify a domain and tags for the article and using that information identify visual content from other publishers to display to the user (e.g., on the page with the article). For example, the domain may be football and the tags may include the date of the event and the entities involved. In this way, the content provider may identify and provide the visual content for the event without manual curation or providing content unrelated to the particular event. Moreover, by identifying the domain, the visual content search for the tags may be restricted to the corresponding corpus and thereby be completed more quickly and efficiently.

One example embodiment relates to a method for automatically identifying additional content about an event in an article. The method may include identifying a domain for the article. The method may include identifying an article type for the article using one or more domain-specific smart tags for the identified domain. The method may include converting at least a portion of the article into a document vector using a pre-trained domain-specific language model for the identified domain. The method may include querying a datastore using the document vector, wherein the datastore stores media content having the identified domain and the identified article type. The method may include obtaining media content results in response to the querying. The method may include ranking the obtained media content results based on a temporal proximity to the event in the article and a relevance score assigned by a relevance model. The method may include based on the ranking, storing the article with at least one result of the obtained media content results embedded with the article. The method may include causing the article and the at least one result of the obtained media content results to be presented.

Another example embodiment relates to a system. The system may include one or more processors; memory in electronic communication with the one or more processors; and instructions stored in the memory, the instructions being executable by the one or more processors to: identify a domain for the article; identify an article type for the article using one or more domain-specific smart tags for the identified domain; convert at least a portion of the article into a document vector using a pre-trained domain-specific language model for the identified domain; query a datastore using the document vector, wherein the datastore stores media content having the identified domain and the identified article type; obtain media content results in response to the querying; rank the obtained media content results based on a temporal proximity to an event in the article and a relevance score assigned by a pre-determined relevance model; based on the ranking, store the article with at least one result of the obtained media content results embedded with the article; and cause the article and the at least one result of the obtained media content results to be presented.

Another example embodiment relates to a method for identifying additional content about an event in an article. The method may include receiving an identification of a domain for the article. The method may include converting at least a portion of the article into an article document vector using a pre-trained domain specific language model for the domain, wherein the pre-trained domain specific language model is trained on a set of input text specific to the domain. The method may include converting at least a portion of content stored in a datastore into a content document vector using the pre-trained domain specific language model for the domain. The method may include generating a list of predicted matches using a relevance score for the article document vector and the content document vector, wherein the relevance score indicates a similarity between the article and the content and is determined by a relevance model and the list of predicted matches includes the content similar to the article. The method may include applying at least one filter to the list of predicted matches to filter the content based on temporal proximity to the event in the article. The method may include generating a list of additional content in response to applying the at least one filter to the list of predicted matches. The method may include storing an association of the article and the list of additional content in a datastore. The method may include causing the article and at least one of the additional content to be presented.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIGS. 3A and 3B illustrates an example method for identifying additional content for an article in accordance with some embodiments of the present disclosure.

DETAILED DESCRIPTION

Figure 1:
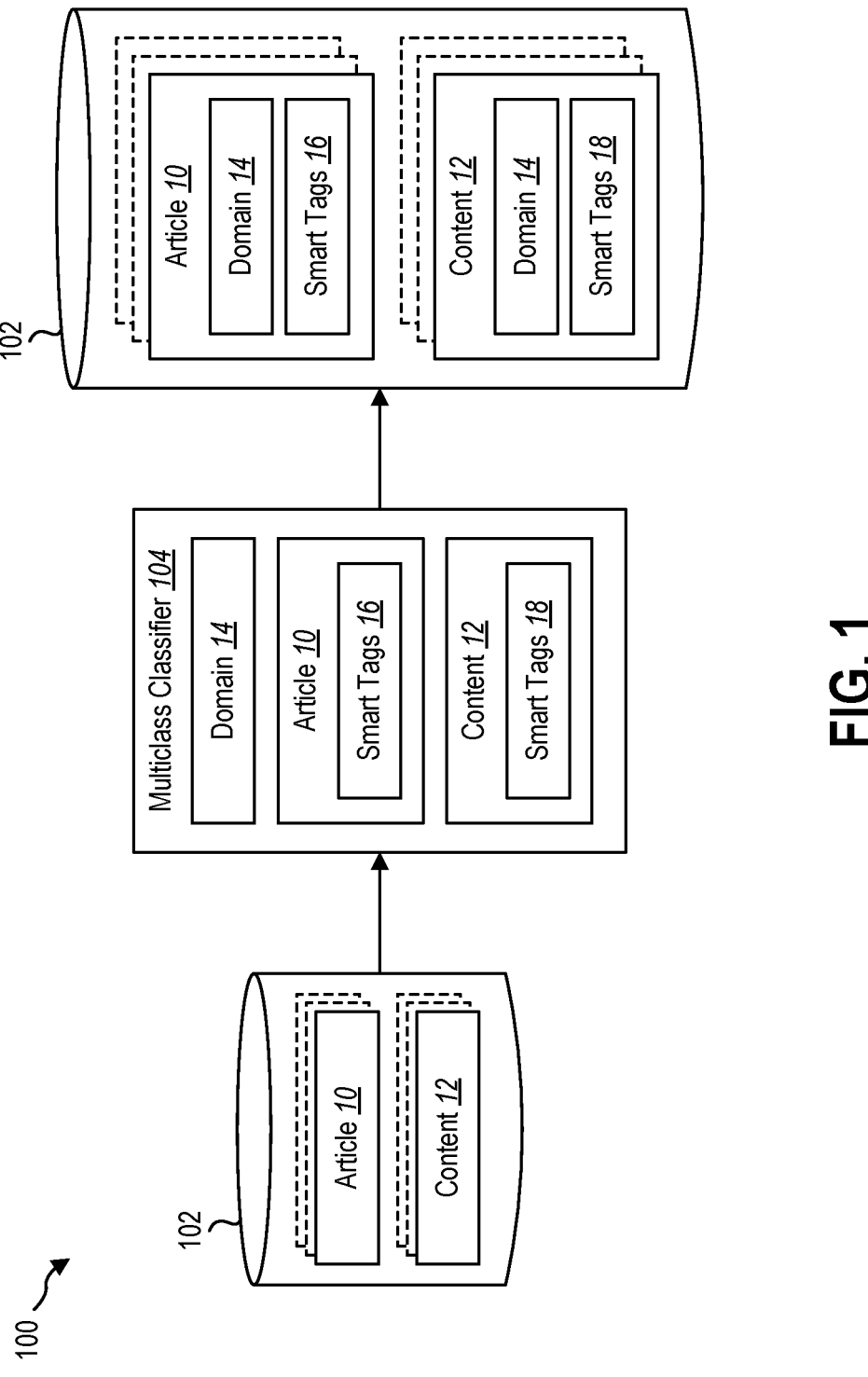
FIG. 1 illustrates an example environment for classifying content with smart tags in accordance with some embodiments of the present disclosure.

This disclosure generally relates to identifying additional content. When users display article webpages on a search engine and/or any website, the article may include content discussing a particular event. Generally, any embedded content displayed along with the article is either manually curated or independent from the article content and therefore may not be related to the particular event. Embedded content may include multimedia content (e.g., videos, photos, images, recordings) and/or any additional content (e.g., social media postings, news feeds, other stories) displayed on the webpages in addition to the article. Currently, the automatically embedded content displayed is selected based on a market sector or domain for the article, but not the particular event described in the article.

For example, some systems convert the article content and the embedded content into a vector space of numerical interpretation using a language model. Typically, language models are trained over a large volume of text from a general corpus of articles which contain articles of all domains and backgrounds and the language models learn to represent the text files in vectors of numerical representations. The language model learns words that appear close to each other have numbers that are close to each other. For example, the vector code for the word "Seattle" has a numerical value close to the vector code for the words "Seahawk", "pacific northwest", and/or "Washington state." However, since the training is typically over a generic corpus that includes all topics, the vocabulary of the language model is diminished for each domain or genre.

The embedded content is generally selected based on comparing the document vectors of the article content to the embedded content and determining which embedded content is close to the document vectors of the article. For example, if the content of an article is about an injury to a basketball player, the related embedded content may include other articles that discuss the same league (NBA) or the same team as the injured player. As such, these recommended videos have content about the same sport or the same team, but the videos do not provide information on the same event (injury, suspension, interview for sports) that the article is reporting about.

Thus, users are currently being served with recommended videos which may be derived due to high engagement for those videos or because the videos are discussing the same domain, such as, sports or weather. The recommended videos shift the attention of the user from the topic of the article, resulting in poor engagement from the users.

The present disclosure is related to devices and methods for automatically identifying additional information for the article content. The additional information may be visual information. In addition, the additional information may describe the same event as the article content or may describe the entities involved in the event and be temporally close. In some embodiments, devices and systems according to the present disclosure automatically present the additional information along with the article. In some embodiments, devices and systems according to the present disclosure automatically embed the additional information in the article and store the article with the embedded additional information. The stored article with the additional information may be displayed when the article is selected by a user or returned by a search engine. In some embodiments, the stored article with the additional information is provided to a content suggestion pipeline providing additional content suggestions for the article. By displaying the additional content with the article, the users are more likely to engage with the additional content. This disclosure includes several practical applications that provide benefits and/or solve problems associated with identifying additional content that supplements the article with additional information about the same event discussed in the article.

For example, if an article is about an injury to a basketball player, the present disclosure identifies additional content about the same event as the article (the injury and/or the player) and automatically presents the additional content along with the article. One example use case of the additional content includes video of an injury described in the article. Another example use case includes a video of an interview of the team coach or player discussing the injury and when the player is scheduled to play again. Another example of the additional content includes an audio recording of an interview of the team coach or player discussing a recent game.

In some embodiments, systems and methods according to the present disclosure classify the articles and/or the content into categories using smart tags using a machine learning multiclass classifier. The multiclass classifier may access a set of predetermined smart tags for the domain to use in classifying the article and/or the content into different categories. The smart tags may be used to identify articles and content discussing the same category or common categories. As such, the smart tags may be used to identify possible pairs of matching articles and/or content belonging to the same category. Articles and content belonging to the same category is processed through the domain specific language model.

Systems and methods according to present disclosure, in some embodiments, use domain specific pretrained language models trained on specific genres of articles. For example, one domain specific language model is trained on sports articles, while a different domain specific language model is trained on weather articles, and a different domain specific language model is trained on finance. The domain specific language models use articles related to the domain as the training set to learn the vocabulary for the specific domain. For example, a sports language model learns to differentiate when articles are discussing the same team, but different events or different articles are discussing injuries of National Football League (NFL) players, but the articles are discussing different teams. In some embodiments, instead of using a general corpus covering all topics to train the domain specific language models, the present disclosure uses articles covering the topics of the domain selected for the language model. As such, each domain specific language model of the present disclosure learns a specific set of vocabulary for the domain or genre of the language model.

In some embodiments, different articles, recordings, videos, and/or images for each domain are provided as input to the domain specific language models. A vector representation of each article, video, and/or image is generated by the domain specific language models. Each vector may include rows of 768 numbers from 0 to 1. For example, for sports, each sports document may have an individual document vector with the numerical representation for the sport document and each video may have an individual document vector with the numerical representation for the video.

In some embodiments, each document vector is fed into a relevance model, such as, a binary logistic regression model, to output a relevance score between 0 and 1 to indicate a likelihood of whether the vectors are similar. For example, the relevance score may indicate that an article and a video are similar to one another. Another example may include the relevance score indicating that an article and a different article are similar. Another example may include the relevance score indicating that an article and a video are not similar to one another.

In some embodiments, one or more filters are applied to the relevance score of the vectors to ensure that the content is relevant to the article. In addition, the one or more filters may be used to ensure that the additional content is describing the same event as the articles or describing the entities involved in the event and temporally close to the event. One example filter includes a relevance score filter that ensures the relevance score of the additional content for the article indicates that the additional content and the article are related. In some embodiments, a filter includes a temporal proximity filter to ensure that the additional content is fresh. The temporal proximity filter evaluates a time difference between when the article is published and when the additional content is added to the content management system to ensure that the additional content is still recent for the events discussed in the article. In some embodiments, a filter includes an entity filter that ensures the article and the related content have at least one entity in common.

In some embodiments, a final list of additional content is generated for each article after filtering based on the machine learning model score, the date, and the entities. The final list of additional content may be presented to a user through embedded content with the article when presented on a webpage. In addition, the final list of additional content may be presented to a content suggestion pipeline.

One technical advantage of some embodiments of the present disclosure is compute savings. By identifying the domain upfront for the articles and/or the content, the pre-trained domain language specific model is selected for the article and/or the content based on the domain resulting in compute savings by only applying the domain language specific model for the domain of the articles and/or the content and not running other language models for other domains. Moreover, by classifying the articles and/or the content using the smart tags into different categories, the computation required for identifying which articles and/or the content may be similar is reduced by having a subset of the articles and/or content that is pre-matched based on the smart tags provided as input to the domain specific language model. As such, the domain language specific model performs processing on a portion of the articles and/or the content, resulting in compute savings by not processing all of the articles and/or the content.

Referring now to FIG. 1, illustrated is an example environment 100 for use with classifying articles 10 and/or content 12. In some embodiments, the environment 100 includes one or more datastores 102 with a plurality of articles 10 and/or a plurality of content 12. Articles 10 may include text discussing a story or reporting an event. Content 12 may include, but is not limited to, multimedia content (videos, images, photos, recordings), news feeds, social media postings, and/or other stories.

In some embodiments, a machine learning common multiclass classifier 104 accesses the articles 10 and/or the content 12 stored in the datastores 102 and may determine a domain 14 for the articles 10 and/or the content 12. Domains 14 may include different genres or categories of the articles 10 and/or the content 12, such as, but not limited to, sports, weather, politics, finance, entertainment, and/or travel. For each article 10, the multiclass classifier 104 may identify the domain 14 for the article 10. In some embodiments, for each content 12, the multiclass classifier 104 may identify the domain 14 for the content 12. In some embodiments, the multiclass classifier 104 may be pretrained to identify the domain 14 of the article 10 and/or the content 12. In some embodiments, the multiclass classifier 104 may be trained in an offline environment and the multiclass classifier 104 may classify the articles 10 and/or the content 12 in the offline environment.

In addition, the multiclass classifier 104 may access a set of smart tags 16, 18 for different domains 14. The smart tags 16, 18 may predetermined for a subset of categories discussed for the domain 14 and may be expanded for all verticals within the domain 14. In some embodiments, smart tags 16, 18 for sports articles include, but are not limited to, injuries, game highlights, press conferences, preview of upcoming games, drafts, and/or transfer news. The number of categories included in the smart tags 16, 18 may vary for different domains 14. For sports, the number predetermined tags may be ten to fifteen. In some embodiments, the multiclass classifier 104 classifies the articles 10 and/or the content 12 using the predetermined smart tags 16, 18 into different categories. Every article 10 and/or content 12 stored in the datastore 102 may be passed through the multiclass classifier 104, which categorizes the data into smart categories for each vertical.

Figure 2:
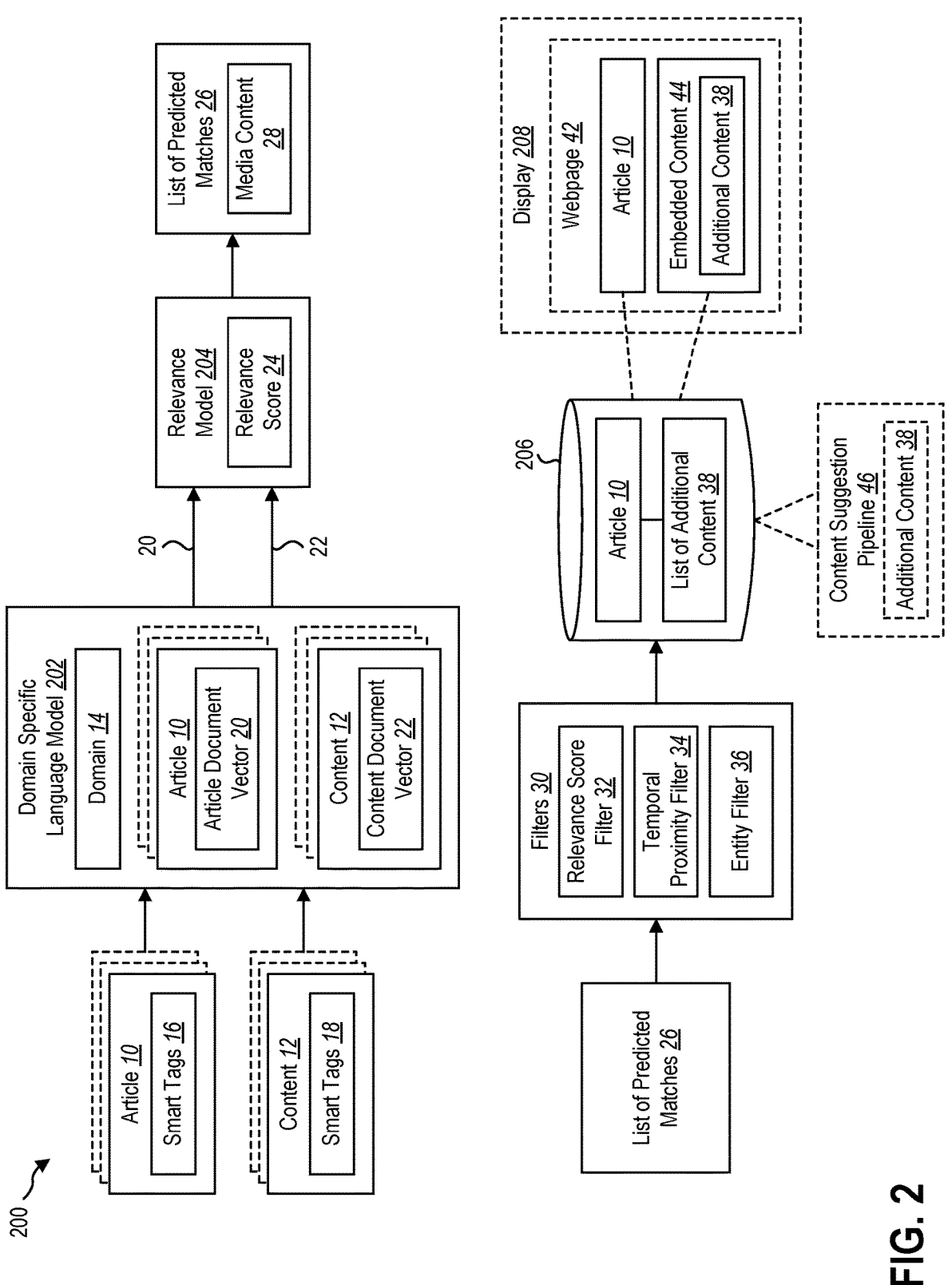
FIG. 2 illustrates an example environment for identifying additional content in accordance with some embodiments of the present disclosure.

In some embodiments, the one or more datastores 102 store the associated domain 14 and/or smart tags 16 for each article 10. In addition, the one or more datastores 102 may store the associated domain 14 and/or smart tags 18 for each content 12. In some embodiments, the datastore 102 is a content management system accessible by different computing devices in environment 100 or environment 200 (FIG. 2). In some embodiments, the articles 10 come from a first content provider and are stored in a first datastore and the content 12 comes from a second content provider and is stored in a second datastore. As such, the articles 10 and the content 12 are published by different content providers and may be stored in separate datastores. In some embodiments, the articles 10 and the content 12 are published by the same content providers and are stored in the same datastore. In some embodiments, the datastores 102 only store the articles 10 and the content 12 for a particular domain 14 and/or article type (injury, game summary, press conferences, etc.). Thus, different datastores 102 only include articles 10 and/or content 12 identified for a specific domain or type.

Referring now to FIG. 2, illustrated is an embodiment of an environment 200 that uses one or more machine learning systems to identify additional content for an article 10. In some embodiments, the environment 200 includes one or more machine learning pre-trained domain specific language models 202 that parses the articles 10 and/or the content 12 and converts the words of the articles 10 and/or the content 12 into a vector representation in numeric format. The pretrained domain specific language models 202 generates an article document vector 20 for each article 10 and a content document vector 22 for each content 12 provided as input. For example, the pretrained domain specific language model 202 may access the articles 10 and/or content 12 stored in datastore 102 (FIG. 1).

In some embodiments, a subset of the articles 10 and/or content 12 is provided as input to the domain specific language model 202. The subset may include articles 10 and/or content 12 that have common categories. In some embodiments, the smart tags 16, 18 are used to identify possible pairs of matching articles 10 and/or content 12 belonging to the same category. A list of articles 10 and/or content 12 may be generated based on the matching smart tags 16, 18. In some embodiments, the list includes ten articles and five videos that have common tags, and thus, a common category. Articles 10 and content 12 belonging to the same category (injury) are processed through the domain specific language model 202. As such, articles 10 and content 12 with common categories are pre-matched and submitted to the domain specific language model 202 for processing. By using the smart tags 16, 18 to predetermined which articles 10 and/or content 12 may be related, compute savings may be achieved by only converting a subset of the articles 10 and/or content 12 into article document vectors 20 or content document vectors 22.

The article document vector 20 represents the article 10 in numerical form and the content document vector 22 represents the content 12 in numerical form. In some embodiments, the article document vector 20 represents a portion of the article 10 (title and body and/or abstract) in numerical form and the content document vector 22 represents a portion of the content 12 (title and body and/or abstract) in numerical form. Each article document vector 20 may include a row of 768 numbers from 0 to 1. In some embodiments, each content document vector 22 includes a row of 768 numbers from 0 to 1. One example use case for sports includes each sports article having an individual article document vector 20 with a numerical representation for each sports article and each sports video having an individual content document vector 22 with a numerical representation for the sports video.

In some embodiments, each domain specific language model 202 is trained on a set of inputs for a specific domain 14. For example, one domain specific language model 202 is trained using sports articles 10, while a different domain specific language model 202 is trained using weather articles 10. By using a tailored training set related to the domain 14 for training the domain specific language models 202 on a specific domain 14, the domain specific language models learn the vocabulary for the specific domain 14 and learn to differentiate between nuances of different vocabulary words. For example, a sports domain specific language model 202 learns to differentiate when articles 10 are discussing the same team but different events. Another example includes a sports domain specific language model 202 learning to different articles 10 discussing injuries of National Football League (NFL) players but are discussing different teams. Instead of using a language model trained on a generic corpus of input text covering all topics, the domain specific language model 202 is trained on a set of input text for a specific domain. As such, each domain specific language model 202 learns a specific set of vocabulary for the specified domain 14 using the set of input text selected for the specified domain 14.

In some embodiments, the domain specific language model 202 is a Bidirectional Encoder Representations from Transformers (BERT) model trained from scratch with specific focus on the domain 14. The training corpus includes news articles scraped from the web related to the domain 14. For example, for a sports domain specific language model 202, the input training text includes sports news articles scraped from the web related to sports from the past 4 years. The articles covered news from Football, Basketball, Hockey, Cricket, Soccer, Baseball, Olympics, Tennis, Golf, MMA, etc. In addition, a tokenizer is trained from scratch to include more sports related tokens to the vocabulary.

In some embodiments, the environment 200 includes multiple domain specific language models 202 running simultaneously. The domain specific language model 202 selected for article 10 is based on the domain 14 of the article 10 and the domain 14 of the domain specific language model 202. For example, a domain specific language model 202 trained for the domain 14 of finance is not used for articles 10 discussing the weather. Instead, a domain specific language model 202 trained for the domain 14 of weather is selected for articles 10 discussing the weather.

In some embodiments, the environment 200 also includes a machine learning relevance model 204 trained to identify which articles 10 are relevant to content 12. The relevance model 204 receives an article document vector 20 and a content document vector 22 as input and generates a relevance score 24 for each article 10 and content 12 pair based on the article document vector 20 and the content document vector 22. The relevance score 24 may be assigned to the article 10 and the content 12 pair and provides a scoring of the similarity between the article 10 and the content 12.

In some embodiments, the relevance model 204 is a simple binary logistic regression model that is trained to output a relevance score 24 for each article 10 and content 12 pair. Each article document vector 20 and each content document vector 22 may be fed into the relevance model 204 to output a relevance score 24 between 0 and 1 to indicate a likelihood of whether the article document vector 20 and the content document vector 22 are similar to one another. For example, the relevance score 24 may indicate that an article 10 and a video are similar. Another example may include the relevance score 24 indicating that an article 10 and a news feed are similar. Another example may include the relevance score 24 indicating that an article 10 and a video are not similar.

In some embodiments, a list of predicted matches 26 of media content 28 related to the article 10 is generated based on the relevance score 24. Content 12 may be included as media content 28 in the list of predicted matches 26 if the relevance score 24 indicates that the article 10 and the content 12 are similar. As such, a subset of the content 12 may be included as media content 28. A list of predicted matches 26 may be generated for each article 10. In some embodiments, the list of predicted matches 26 may include the media content 28 ranked based on the relevance score 24. For example, the media content 28 may be ordered with the relevance scores 24 in a descending order with the highest scores at the top (e.g., relevance scores 24 indicating that the media content 28 is more similar to the article 10 as compared to other media content 28) and the lowest scores at the bottom of the list (e.g., relevance scores 24 indicating that the media content 28 is less similar to the article 10 as compared to another media content 28).

One or more filters 30 may be applied to the list of predicted matches 26 to ensure that the media content 28 is describing the same event as the articles 10 or describing the entities involved in the event and temporally close to the event. The filters 30 may be used to remove media content 28 from the list of predicted matches 26 that is not relevant to the article 10 and/or remove media content 28 that is less relevant to the article 10 as compared to other media content 28 included in the list of predicted matches 26.

In some embodiments, a filter 30 includes a relevance score filter 32. The list of predicted matches 26 is filtered based on the relevance score 24 of the media content 28. For example, media content 28 with relevance scores 24 over a score threshold remains in the list of predicted matches 26 and media content 28 below the score threshold is removed from the list of predicted matches 26. Another example may include selecting a number of media content 28 to keep in list of predicted matches 26 (e.g., the 10 videos with the highest score). As such, the relevance score filter 32 may remove media content 28 that may be less relevant to the article 10 as compared to other media content 28 from the list of predicted matches 26 based on the relevance score 24.

Another example filter 30 may include a temporal proximity filter 34. In some embodiments, the temporal proximity filter 34 filters the list of predicted matches 26 to ensure that the media content 28 is recent or fresh relative to the event in the article. The temporal proximity filter 34 evaluates a time difference between a publication date when the article 10 is published and a date identifying when the media content 28 is added to the content management system. The temporal proximity filter 34 may establish a threshold value for the time difference. In some embodiments, if the time difference exceeds the threshold value, the temporal proximity filter 34 removes the media content 28 from the list of predicted matches 26 (e.g., the media content 28 is old or stale for the information discussed in the article 10). In some embodiments, if the time difference is below the threshold value, the temporal proximity filter 34 determines that the media content 28 is recent as compared to when the article 10 was published and may keep the media content 28 on the list of predicted matches 26. The temporal proximity filter 34 may be used to ensure that the media content 28 is for the same event reported in the article 10.

One example use case includes a threshold value for the time difference between the article 10 and the media content 28 of two days. The article 10 is published this week and reports an injury to the quarterback for the Seattle Seahawks and a media content 28 is of a video showing an injury to a different player for the Seattle Seahawks seven days ago. The relevance score 24 generated for the article 10 and the video is high because both the article and the video discuss an injury to a player for the Seattle Seahawks. However, because the video exceeds the threshold value for time difference (older than two days), the video is removed from the list of predicted matches 26. A user may not be interested in the content of the video because the user may already know the news from last week about the injury and the content of the video may be old relative to news of the article 10 published this week.

Another example use case includes a threshold value for the time difference between the article 10 and the media content 28 of three days. The article is published yesterday and reports an injury to the quarterback for the Seattle Seahawks and the media content 28 is of a video showing an interview discussing the injury to the quarterback for the Seattle Seahawks. The video is added to the content management system today. The video remains on the list of predicted matches 26 because the video is within the threshold value of two days between the article 10 publishing (yesterday) and when the media content 28 is added to the content management system (today).

Another example filter 30 may include an entity filter 36 to ensure that the article 10 and the media content 28 include one entity in common. An entity extractor may extract entities mentioned in the article 10, such as, location names, sport team names, business names, and/or individual names. For example, for a weather article, the entity extractor extracts the name of the cities mentioned in the article. Another example may include a political article and the entity extractor extracts the name of the politicians mentioned in the article. Another example may include a sports article and the entity extractor extracts the name of the sports teams and players mentioned in the article.

In some embodiments, if a match occurs between at least one entity mentioned in the article 10 and one entity mentioned in the media content 28, the media content 28 remains on the list of predicted matches 26. In some embodiments, if a match does not occur between at least one entity mentioned in the article 10 and one entity mentioned in the media content 28, the media content 28 is removed from the list of predicted matches 26.

For example, an article may be about an interview a celebrity did about the presidential election and the entity extraction may extract the entities "Celebrity Name", "President Candidate Name1", and "President Candidate Name2" from the article. The video candidate may be a video of the interview of the celebrity talking about the presidential election and the entity extraction may extract the entities "Celebrity Name", "President Candidate Name1", and "President Candidate Name2" from the video candidate. The video candidate may be tagged as additional content describing the same event because of the match between the entities. As such, the entity filter 36 ensures that the article 10 and the media content 28 has at least one entity in common. The entity filter 36 may be used to ensure that the media content 28 is for the same event reported in the article 10.

In some embodiments, after applying one or more filters 30 to the media content 28 on the list of predicted matches 26, a final list of additional content 38 is generated for the article 10 based on the media content 28 remaining on the list of predicted matches 26. For each article 10, a list of additional content 38 may be mapped to the article 10. The list of additional content 38 may be ranked based on the entities extracted and/or the categories. For example, the additional content 38 with more matches with the entities mentioned in the article 10 may be placed higher on the list of additional content 38 as compared to additional content with less matches with entities mentioned in the article 10.

The mapping between the article 10 and the final list of additional content 38 may be stored in a datastore 206. The datastore 206 may be a content management system accessed by one or more computing devices of environment 200. The datastore 206 may the same datastore used in environment 100, datastore 102 (FIG. 1) or may be a different datastore.

In some embodiments, one or more of the additional content 38 is automatically presented along with the article 10. For example, the additional content 38 is presented nearby or adjacent to the article 10. In some embodiments, the final list of additional content 38 is presented to a user as embedded content 44 in an article 10 when the article 10 is presented on a webpage 42 on a display 208. In some embodiments, the final list of additional content 38 is provided to a content suggestion pipeline 46 used by one or more computing devices of environment 200.

In some embodiments, one or more computing devices is used to perform the processing of environment 200. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the domain specific language models 202, the relevance model 204, applying the one or more filters 30, and/or storing the final list of additional content 38 is implemented wholly on the same computing device. Another example includes one or more subcomponents of the domain specific language models 202, the relevance model 204, applying the one or more filters 30, and/or storing the final list of additional content 38 implemented across multiple computing devices. Moreover, in some embodiments, the domain specific language models 202, the relevance model 204, applying the one or more filters 30, and/or storing the final list of additional content 38 may be implemented are processed on different server devices of the same or different cloud computing networks.

In some embodiments, each of the components of the environment 200 is in communication with each other using any suitable communication technologies. In addition, while the components of the environment 200 are shown to be separate, any of the components or subcomponents may be combined into fewer components, such as into a single component, or divided into more components as may serve a particular embodiment. In some embodiments, the components of the environment 200 include hardware, software, or both. For example, the components of the environment 200 may include one or more instructions stored on a computer-readable storage medium and executable by processors of one or more computing devices. When executed by the one or more processors, the computer-executable instructions of one or more computing devices can perform one or more methods described herein. In some embodiments, the components of the environment 200 include hardware, such as a special purpose processing device to perform a certain function or group of functions. In some embodiments, the components of the environment 200 include a combination of computer-executable instructions and hardware.

In some embodiments, the environment 200 is used to automatically identify additional content 38 that is describing the same event as the articles 10 or describing the entities involved in the event and temporally close to the event by linking the additional content 38 to the articles 10. By identifying additional content 38 that is describing the same event as the articles, user engagement may be increased by keeping the user within the same ecosystem.

Figure 3B:
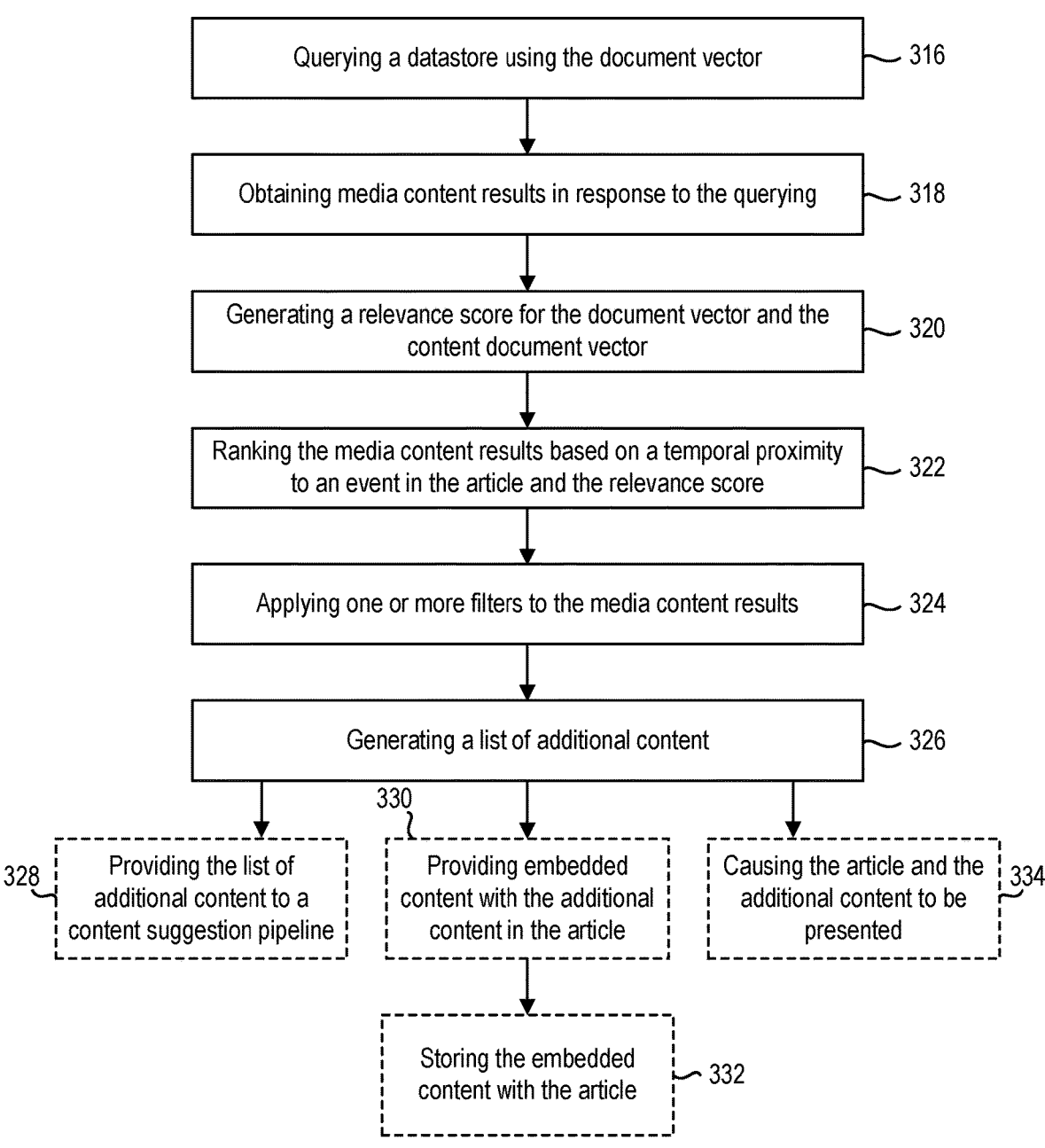

Referring now to FIGS. 3A and 3B, illustrated is an embodiment of a method 300 performed by one or more computing devices of environments 100 and 200 for identifying additional content 38 (FIG. 2) for an article 10 (FIG. 2). The actions of method 300 are discussed below with reference to the architecture of FIGS. 1 and 2 but may be applicable to other specific environments.

In some embodiments, the method 300 includes identifying a domain for an article at 302. A common multiclass classifier 104 may access the articles 10 stored in a datastores 102 and may determine a domain 14 for the articles 10. The multiclass classifier 104 may be a machine learning model pretrained offline to identify the domain 14 of the article 10. Domains 14 may include different genres or categories of the articles 10. For each article 10, the multiclass classifier 104 may identify the domain 14 for the article 10. The articles 10 stored in the datastore 102 may have the same domain 14 or may have different domains 14.

The method 300 includes, in some embodiments, classifying the article based on smart tags for the domain at 304. The multiclass classifier 104 may access a set of predetermined smart tags 16 for the domain 14 to use in classifying the article 10 into different categories. The smart tags 16 may be a subset of the categories discussed for the domain 14 and may be expanded for all verticals within the domain 14. Examples of smart tags 16 for a sports article 10 may include, but are not limited to, injuries, game highlights, press conferences, preview of upcoming games, drafts, and/or transfer news. The number of categories included in the smart tags 16 may vary for different domains 14. For sports, the number predetermined tags may be ten to fifteen. The multiclass classifier 104 may classify the article 10 based on the words of the article 10 using the smart tags 16 for the domain 14. As such, the domain-specific smart tags 16 may be used to identify an article type for the articles 10. The multiclass classifier 104 may be trained in an offline environment and may classify the articles 10 offline using the smart tags 16.

The method 300 includes classifying content based on the smart tags for the domain at 306. The common multiclass classifier 104 may also access the content 12 stored in the datastores 102 and may determine a domain 14 for the content 12. The content 12 may include, but is not limited to, multimedia content (videos, images, photos, recordings), news feeds, social media postings, and/or other articles.

In some embodiments, the multiclass classifier 104 classifies the content 12 into different categories using the predetermined smart tags 18 for the domain 14. The multiclass classifier 104 may classify the articles 10 offline using the smart tags 16.

In some embodiments, method 300 includes determining whether a match occurs between the smart tags for the article and the content at 308. The smart tags 16 for the article 10 may be compared to the smart tags 18 for the content 12 to identify possible pairs of matching articles 10 and/or content 12 belonging to the same category. If a match occurs between one or more smart tags 16 for the article 10 and one or more smart tags 18 for the content 12, the article 10 and/or the content 12 may belong to the same category. For example, if the article 10 has smart tags 18 for "injuries," "game highlights," and "press conferences," and the content 12 has smart tags 16 for "injuries" and "transfer news," a match may be determined between the smart tags 16, 18 for "injuries." As such, the article 10 and the content 12 may be identified as a possible pair belonging to the same category of sports.

In some embodiments, the method 300 includes selecting different content if a match does not occur between one or more smart tags for the article and the content at 310. If a match does not occur for one or more smart tags 16 for the article 10 and one or more smart tags 18 for the content 12, different content 12 may be selected from the datastore 102. The smart tags 18 for the different content 12 may be compared to the smart tags 16 for the article 10 as a possible match. In some embodiments, this repeats until all articles 10 and content 12 pairs from the content management system have been compared.

The method 300 further includes, in some embodiments, converting at least a portion of the article into a document vector using a pre-trained domain specific language model at 312. If a match occurs between one or more smart tags 16 for the article 10 and one or more smart tags 18 for the content 12, a list of articles 10 and/or content 12 may be generated based on the matching smart tags 16, 18. For example, the list may include ten articles and five videos that have common tags. The articles 10 and the content 12 with common categories are pre-matched and submitted to the domain specific language model 202 for processing.

Environment 200 may include one or more machine learning pre-trained domain specific language models 202 that parses the articles 10 and converts the words of the articles 10 into a vector representation in numeric format. In some embodiments, the article document vector 20 represents a portion of the article 10 (title and body and/or abstract) in numerical form. Each article document vector 20 may include a row of 768 numbers from 0 to 1. The pretrained domain specific language models 202 generates an article document vector 20 for each article 10 provided as input.

Environment 200 may have multiple domain specific language models 202 running simultaneously. Each domain specific language model 202 is trained on a set of inputs for a specific domain 14. For example, one domain specific language model 202 is trained using sports articles 10, while a different domain specific language model 202 is trained using weather articles 10. By using a training set selected specifically for the domain 14 for training the domain specific language models 202, the domain specific language models learn the vocabulary for the specific domain 14 and may differentiate between different vocabulary words.

An identification of the domain 14 of the article 10 may be received and a domain specific language model 202 for the domain 14 may be selected for converting the article 10 into an article document vector 20. For example, a domain specific language model 202 for a weather domain is not used for articles 10 on politics. Instead, a domain specific language model 202 for politics is selected for an article 10 discussing politics.

By identifying the domain 14 upfront for the articles 10 and/or the content 12, the pre-trained domain language specific model 202 is selected for the article 10 and/or the content 12 based on the domain 14. As such, compute savings are achieved by only applying the domain language specific model 202 for the domain 14 of the articles 10 and/or the content 12 and not running other language models for other domains 14. Moreover, by classifying the articles 10 and/or the content 12 using the smart tags 16, 18 into different categories, the computation required for identifying which articles 10 and/or the content 12 may be similar is reduced by having a subset of the articles 10 and/or content 12 that is pre-matched based on the smart tags 16, 18 provided as input to the domain specific language model 202. As such, domain language specific model 202 performs processing on a portion of the articles 10 and/or the content 12, resulting in compute savings by not processing all of the articles 10 and/or the content 12.

In some embodiments, the method 300 includes converting at least a portion of the content into a content document vector using the pre-trained domain specific language model at 314. The domain 14 of the content 12 may be identified and the domain specific language model 202 for the domain 14 may be selected for converting the content 12 into a content document vector 22. The domain specific language models 202 parses the content 12 and converts the content 12 into a vector representation in numeric format. In some embodiments, the content document vector 22 represents a portion of the content 12 (title and body and/or abstract) in numerical form. Each content document vector 22 may include a row of 768 numbers from 0 to 1. The pretrained domain specific language models 202 generates a content document vector 22 for each content 12 provided as input.

In some embodiments, the method 300 includes querying a datastore using the document vector at 316. A query may be sent to datastore(s) 102, 206 with the document vector (e.g., article document vector 20) for the article 10. The datastore(s) 102, 206 may contain media content (e.g., the content 12) having the identified domain 14 and/or the identified article type (e.g., injuries, game highlights, press conferences, preview of upcoming games, drafts, and/or transfer news).

In some embodiments, the method 300 includes obtaining media content results in response to the querying. Media content 28 may be obtained from the datastore(s) 102, 206 in response to the querying. Media content 28 may be obtained for each article 10. In some embodiments, a list of predicted matches 26 of media content 28 related to the article 10 may be generated. Media content 28 may be included in the list of predicted matches 26 if the article 10 and the content 12 are related (e.g., media content 28 is included in the list of predicted matches 26 based on the relevance score 24 indicating that the media content 28 is related to the article 10). In some embodiments, at least one result of the obtained media content results is media content 28 that shows the event described in the text article (e.g., a video that aligns specifically with the article text). For example, the article 10 describes a storm hitting a city and the video shows footage of the storm hitting the city. In some embodiments, at least one result of the obtained media content results is media content 28 that is a voice recording. For example, the article 10 describes a player traded to another team and the voice recording is of the coach describing details of the trade.

In some embodiments, the method 300 includes generating a relevance score for the document vector and the content document vector at 320. A machine learning relevance model 204 trained to identify which articles 10 are similar to content 12 may be used for determining the relevance score 24. The relevance model 204 receives an article document vector 20 and a content document vector 22 as input and generates a relevance score 24 for each article 10 and content 12 pair based on the similarity between the article document vector 20 and the content document vector 22. The relevance score 24 may be assigned to the article 10 and the content 12 pair and provides a scoring of the similarity of content between the article 10 and the content 12.

In some embodiments, the relevance model 204 is a common binary logistic regression machine learning model that is trained to output a relevance score 24 for each article 10 and content 12 pair. Each article document vector 20 and each content document vector 22 may be fed into the relevance model 204 to output a relevance score 24 between 0 and 1 to indicate a likelihood of whether the article document vector 20 and the content document vector 22 are related. For example, a relevance score 24 is generated for Video A and Article A indicating that Video A and Article A are related. Another example may include a different relevance score 24 is generated for Video B and Article A indicating that Video B and Article A are related. Another example may include a different relevance score 24 is generated for Video B and Article B indicating that Video B and Article B are not related.

In some embodiments, the method 300 includes ranking the media content results based on a temporal proximity to an event in the article and the relevance score at 322. The media content 28 may be ranked based on a temporal proximity to an event in the article 10 and/or the relevance score 24. For example, the media content 28 may be ordered with the relevance scores 24 in a descending order with the highest scores at the top of the list (e.g., relevance scores 24 indicating that the media content 28 is more similar to the article 10 as compared to other media content 28) and the lowest scores at the bottom of the list (e.g., relevance scores 24 indicating that the media content 28 is less similar to the article 10 as compared to another media content 28). In addition, the media content 28 may be ordered based on a time difference between a publication date when the article 10 is published and a date indicating when the media content 28 are added to the content management system. Media content 28 with a low time difference (e.g., same day or one day) may be placed at the top of the list relative to other time differences (e.g., two days or a week). As such, the media content 28 temporally close to the event in the article are ranked higher relative to the media content 28 temporally further from the event in the article.

In some embodiments, the method 300 includes applying one or more filters to the media content results at 324. One or more filters 30 may be applied to the media content 28 and/or the list of predicted matches 26 to ensure that the media content 28 is relevant to the article 10. For example, the one or more filters 30 are used to ensure that the media content 28 is discussing the same event as the articles 10 or describing the entities involved in the event and temporally close to the event. The filters 30 may be used to remove media content 28 from the media content results and/or the list of predicted matches 26 that is not discussing the same event as the article 10 and/or remove media content 28 that is less relevant to the article 10 as compared to other media content 28 included in the media content results and/or the list of predicted matches 26.

One example filter 30 may include a relevance score filter 32. In some embodiments, the media content results and/or the list of predicted matches 26 is filtered based on the relevance score 24 of the media content 28. For example, media content 28 with relevance scores 24 over a score threshold remains in the list of predicted matches 26 and media content 28 below the score threshold is removed from the list of predicted matches 26. Another example may include selecting a number of media content 28 to keep in list of predicted matches 26 (e.g., the 10 videos with the highest score). As such, the relevance score filter 32 may filter the media content results and/or the list of predicted matches 26 by removing media content 28 based on the relevance score 24.

Another example filter 30 may include a temporal proximity filter 34. The temporal proximity filter 34 may identify a temporal event and link the article 10 and the content 12 the event. In some embodiments, the temporal proximity filter 34 filters the media content results and/or the list of predicted matches 26 to ensure that the media content 28 that remains on the media content results and/or the list of predicted matches 26 is recent or fresh as compared to the event in the article 10. The temporal proximity filter 34 may be used to ensure that the media content 28 is for the same event reported in the article 10. The temporal proximity filter 34 evaluates a time difference between a publication date when the article 10 is published and a date indicating when the media content 28 is added to the content management system. The temporal proximity filter 34 may establish a threshold value for the time difference. If the time difference exceeds the threshold value, the temporal proximity filter 34 may remove the media content 28 from the media content results and/or the list of predicted matches 26 (e.g., the media content 28 is old or stale as compared when the article 10 published). If the time difference is below the threshold value, the temporal proximity filter 34 may determine that the media content 28 is recent as compared to when the article 10 published and may keep the media content 28 in the media content results and/or in the list of predicted matches 26.

Another example filter 30 may include an entity filter 36 to ensure that the article 10 and the media content 28 include one entity in common. In some embodiments, the entity filter 36 is used to ensure that the media content 28 is for the same event reported in the article 10. In some embodiments, an entity extractor extracts entities mentioned in the article, such as, location names, sport team names, business names, and/or individual names. In some embodiments, if a match occurs between at least one entity mentioned in the article 10 and at least one entity mentioned in the media content 28, the media content 28 remains on the media content results and/or the list of predicted matches 26. In some embodiments, if a match does not occur between at least one entity mentioned in the article 10 and one entity mentioned in the media content 28, the media content 28 is removed from the media content results and/or the list of predicted matches 26. As such, the entity filter 36 may ensure that the article 10 and the media content 28 has at least one entity in common.

In some embodiments, the method 300 includes generating a list of additional content at 326. After applying one or more filters 30, a final list of additional content 38 may be generated for the article 10. The final list of additional content 38 may include the media content 28 remaining on the media content results and/or the list of predicted matches 26 after the one or more filters are applied to the media content 28. For each article 10, a list of additional content 38 may be mapped to the article 10. The list of additional content 38 may be ranked based on the entities extracted and/or the categories. For example, additional content 38 with more matches with the entities mentioned in the article 10 may be placed higher on the list of additional content 38 as compared to additional content with less matches with entities mentioned in the article 10.

In some embodiments, the method 300 may optionally include providing the list of additional content to a content suggestion pipeline at 328. The final list of additional content 38 may be provided to a content suggestion pipeline 46 used by one or more computing devices of environment 200 in identifying additional content for the articles 10.

In some embodiments, the method 300 may optionally include providing embedded content with the additional content in the article at 330. The final list of additional content 38 may be presented to a user as embedded content 44 in an article 10 when the article 10 is presented on a webpage 42 on a display 208. For example, the article 10 may be called by the webpage 42 and the embedded content 44 may be presented when the article 10 is loaded on the webpage 42. The embedded content 44 may be presented above the article 10, below the article 10, nearby the article 10, adjacent to the article 10, within the article 10, and/or next to the article 10.

In some embodiments, the method 300 may optionally include storing the embedded content with the article at 332. The association between the article 10 and the final list of additional content 38 may be stored in a datastore 206. The datastore 206 may be a content management system accessed by one or more computing devices of environment 200.

In some embodiments, the method 300 may optionally include causing the article and the additional content to be presented at 334. One or more of the additional content 38 may be presented with the article 10 on a display 208. The additional content 38 may be presented nearby the article 10, within the article 10, above the article 10, below the article 10, adjacent to the article 10, and/or on the side of the article 10. If more than one additional content 38 is presented along with the additional content 38, different additional content 38 may be presented in different locations relative to the article 10 (e.g., one of the additional content 38 may be presented above the article 10, a different additional content 38 may be presented next to the article 10, and another additional content 38 may be presented below the article 10). The additional content 38 may be visual content or audio content that aligns specifically with the text of the article 10 and is presented nearby or adjacent to the article 10.

One example use case includes the text of the article 10 describing a collision during a soccer game where a player broke his leg. The additional content 38 presented along with the article may include a video showing the collision and the injury to the player's leg and a voice recording of an interview of the player discussing the collision and the injury.

As such, in some embodiments, the method 300 is used to predetermine the list of additional content 38 for each article 10 and pre-associate the additional content 38 with the article 10, for example, by embedding the additional content 38 into the article 10. Thus, each time the article 10 is called by a webpage, or accessed by a user, the additional content 38 is already embedded within the article 10 and is loaded when the article 10 loads, resulting in compute savings.

Moreover, as new content 12 is published to the content management system, method 300 may be used to update the list of additional content 38 for the articles 10 based on the new content 12 added to the content management system. In addition, as new articles 10 are published to the content management system, method 300 may be used to generate the list of additional content 38 for the new articles 10. In some embodiments, the method 300 runs at a predetermine time (e.g., every hour) to access the most recently published articles 10 and/or content 12. Thus, each time the article 10 is called by a webpage and/or accessed, the most recent list of additional content 38 may be embedded with the article 10.

Figure 4:
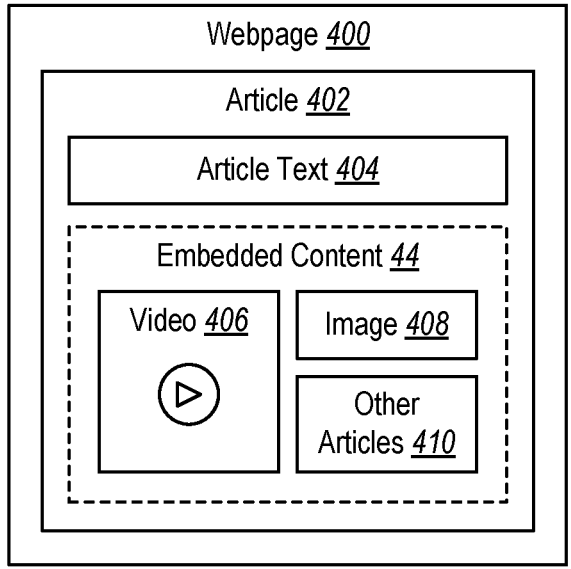
FIG. 4 illustrates an example graphical user interface of a webpage displaying an article with embedded additional content in accordance with some embodiments of the present disclosure.

Referring now to FIG. 4, illustrated is an embodiment of a graphical user interface of a webpage 400 presented on a display 208 (FIG. 2). The webpage 400 may be presented in a browser. In some embodiments, the webpage 400 displays an article 402 and a plurality of embedded content 44. The article 402 may include article text 404 and embedded content 44. In some embodiments, the embedded content 44 includes one or more of a video 406, an image 408, and a news feed listing other articles 410. For example, the article text 404 includes a story about a tackle during a football game where a player's helmet flew fifteen yards and the video 406 shows the tackle of the player and the player's helmet flying the fifteen yards. As such, the embedded content 44 may include visual content that aligns specifically with the text of the article.

In some embodiments, the webpage 400 accesses the article 402 and the embedded content 44 from the datastore 206. The embedded content 44 may be determined using the one or more computing devices of environment 200 (FIG. 2) and may include the list of additional content 38 associated and/or mapped to article 402. As such, the video 406, the image 408, and the news feed of other articles 410 may be included in the list of additional content 38 associated with the article 402. Moreover, the video 406, the image 408 and the news feed of other articles 410 may be describing or showing the same event reported in the article 402 or describing the entities involved in the event and temporally close to the event.

In some embodiments, a user searches for and/or otherwise access the article 402 using the webpage 400. Each time the article 402 is called by the webpage 400, or accessed by the user, the embedded content 44 is already stored with the article 402 in the datastore 206 and the embedded content 44 is loaded when the article 402 loads. While the embedded content 44 is illustrated below the article text 404, the embedded content 44 may be presented adjacent to the article text 404, above the article text 404, nearby the article text 404, or within the article text 404.

Figure 5:
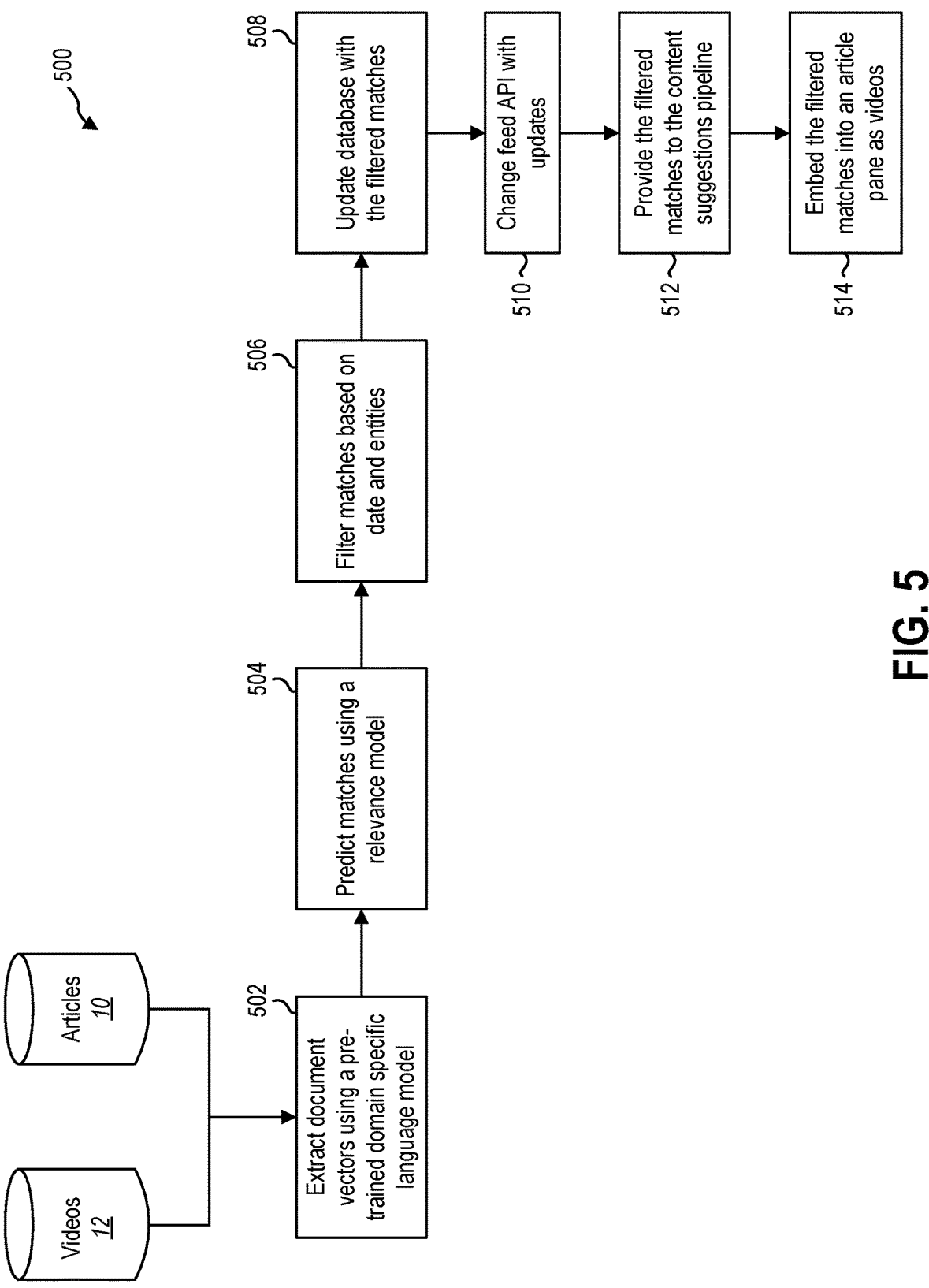
FIG. 5 illustrates an example method for identifying relevant videos to an article in accordance with some embodiments of the present disclosure.

Referring now to FIG. 5, illustrated is an embodiment of a method 500 performed by one or more computing devices of environments 100 (FIG. 1) and 200 (FIG. 2) for identifying relevant videos (e.g., content 12) to an article 10 (FIG. 2). The actions of method 500 are discussed below with reference to the architecture of FIGS. 1 and 2 but may be applicable to other environments.

In some embodiments, the method 500 includes extracting document vectors using a pre-trained domain specific language model at 502. A set of videos 12 and/or articles 10 may be input into a machine learning domain specific language model 202. In some embodiments, the articles 10 come from a first content provider and are stored in a first datastore and the videos 12 comes from a second content provider and is stored in a second datastore. As such, the articles 10 and the videos 12 are published by different content providers and may be stored in separate datastores. In some embodiments, the articles 10 and the videos 12 are published by the same content providers and are stored in the same datastore. As discussed above in FIGS. 3A and 3B, environment 200 may have multiple machine learning domain specific language models 202 running simultaneously. Each domain specific language model 202 is trained on a set of inputs for a specific domain 14 and the domain specific language model 202 for the domain of the videos 12 and the articles 10 is selected to process the videos 12 and the articles 10.

The domain specific language model 202 converts the title and body or abstract of both the articles 10 and the videos 12 to document vectors. The document vectors generated by the domain specific language model 202 for the articles 10 (e.g., the article document vector 20) and the videos 12 (e.g., the content document vector 22) are extracted.

In some embodiments, the method 500 includes predicting matches using a relevance model 204 at 504. A relevance model 204 may be trained to identify the top articles 10 which are relevant to a given video 12. The relevance model

204 may be a logistic regression model that outputs a relevance score for each article and video pair using the document vectors for the video 12 and the article 10 as input (e.g., the article document vector 20 and the content document vector 22). A list of predicted matches 26 with the video candidates (e.g., media content 28) may be generated using the relevance model 504.

In some embodiments, the method 500 includes filtering the matches based on date and entities at 506. In addition, a temporal proximity filter 34 may be applied to the video candidate list. The temporal proximity filter 34 may filter the results of the video candidate list based on a time difference between the time that article was published and a time that video was added to the content management system. In addition, the temporal proximity filter 34 may identify a temporal event and link the article 10 and the video candidates to the event.

An entity filter 36 may also be applied to the video candidate list. An entity extractor may extract important entities, such as name of sports teams (for sports articles), cities (for weather articles), people (for politics), etc. from the article 10 and the video candidates. Video candidates that do not include common entities with the article 10 may be removed from the video candidate list. The video candidate list may be ranked based on the entities extracted and the categories.

In some embodiments, the method 500 includes updating a datastore with the filtered matches at 508. The filtered video candidate list (e.g., list of additional content 38) may be stored in the datastore 206. The filtered video candidate list is used to embed the videos into articles 10 to serve to the user.

In some embodiments, the method 500 includes changing a feed application programming interface (API) with updates at 510. The feed application API may include the filtered video candidate list. The feed application API may be accessed by a plurality of computing devices to receive the filtered video candidate list.

In some embodiments, the method 500 includes providing the filtered matches to the content suggestion pipeline at 512. The filtered video candidate list may be provided to a content suggestion pipeline accessible by a plurality of computing devices and/or applications. The plurality of computing device and/or applications may use the filtered video candidate list.

In some embodiments, the method 500 includes embedding the filtered matches into an article pane as videos at 514. The filtered video candidate list may be automatically embedded with the article pane as videos and served to the user. As such, method 500 may be used to identify relevant videos to an article. The relevant videos may be automatically embedded with an article page as videos and displayed to the user upon loading of the article 10 on a webpage.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

INDUSTRIAL APPLICABILITY

The present disclosure is related to devices and methods for automatically identifying additional content for the article content. The additional content may be visual information. The additional content identified may describe the same event as the article content or may describe the entities involved in the event and be temporally close to the event. The additional content may be automatically presented along with the article. The additional content may also be automatically embedded with an article pane of the article and stored with the article in a datastore. The stored article with the additional content may be loaded on a webpage and displayed when the article is selected by a user or returned by a search engine. In addition, the stored article with the additional content may be provided to a content suggestion pipeline providing additional content suggestions for use by one or more computing devices and/or applications. By displaying the additional content with the article, the users are more likely to engage with the additional content and remain withing the same ecosystem.

For example, if an article is about an injury to a basketball player, the identified additional content about the same event as the article (the injury and/or the player) and may automatically present the additional content along with the article. One example use case of the additional content includes video of an injury described in the article. Another example use case of the additional content includes an interview of the team coach or player discussing the injury and when the player is scheduled to play again.

In some embodiments, the articles and/or the content are pre-classified into categories using smart tags using a machine learning multiclass classifier. The multiclass classifier may access a set of predetermined smart tags for the domain to use in classifying the article and/or the content into different categories. The smart tags may be a subset of the categories discussed for the domain and may be expanded for all verticals within the domain. Examples of smart tags for a sports article may include, but are not limited to, injuries, game highlights, press conferences, preview of upcoming games, drafts, and/or transfer news. The number of categories included in the smart tags may vary for different domains. For sports, the number predetermined tags may be ten to fifteen. The multiclass classifier may be trained in an offline environment and may classify the articles offline using the smart tags.

In some embodiments, the smart tags are used to identify articles and content describing the same category or common categories. As such, the smart tags may be used to identify possible pairs of matching articles and/or content belonging to the same category. In some embodiments, the articles come from a first content provider and are stored in a first datastore and the content comes from a second content provider and is stored in a second datastore. As such, the articles and the content are published by different content providers and may be stored in separate datastores. In some embodiments, the articles and the content are published by the same content providers and are stored in the same datastore. In some embodiments, the datastores only store the articles and the content for a particular domain and/or article type (injury, game summary, press conferences, etc.). Thus, different datastores only include articles and/or content identified for a specific domain or type.

Articles and content belonging to the same category are processed through the domain specific language model. Domain specific pretrained language models trained on specific genres of articles are used to parse the articles and convert the words of the articles into a vector representation in numeric format. In some embodiments, the article document vector represents a portion of the article (title and body and/or abstract) in numerical form. Each article document vector may include a row of 768 numbers from 0 to 1. The pretrained domain specific language models generate an article document vector for each article provided as input.

In some embodiments, the domain specific language models are also used to parse the content and convert the content into a vector representation in numeric format. In some embodiments, the content document vector represents a portion of the content (title and body and/or abstract) in numerical form. Each content document vector may include a row of 768 numbers from 0 to 1. The pretrained domain specific language models generate a content document vector for each content provided as input.

In some embodiments, multiple domain specific language models run simultaneously. The domain specific language model selected for article is based on the domain of the article. For example, a domain specific language model trained for the domain of finance is not used for articles discussing the weather. Instead, a domain specific language model trained for the domain of weather is selected for articles discussing the weather.

For example, one domain specific language model is trained on sports articles, while a different domain specific language model is trained on weather articles, and a different domain specific language model is trained on finance. The domain specific language models use articles related to the domain as the training set to learn the vocabulary for the specific domain. For example, a sports language model learns to differentiate when articles are discussing the same team, but different events or different articles are discussing injuries of National Football League (NFL) players, but the articles are discussing different teams. Instead of using a general corpus covering all topics to train the domain specific language models, articles covering the topics of the domain selected for the language model are used as training input to train the domain specific language models. As such, each domain specific language model learns a specific set of vocabulary for the domain or genre of the language model.

In some embodiments, the domain specific language model is a Bidirectional Encoder Representations from Transformers (BERT) model trained from scratch with specific focus on the domain. The training corpus includes news articles scraped from the web related to the domain. For example, for a sports domain specific language model, the input training text includes sports news articles scraped from the web related to sports from the past 4 years. The articles covered news from Football, Basketball, Hockey, Cricket, Soccer, Baseball, Olympics, Tennis, Golf, MMA, etc. In addition, a tokenizer is trained from scratch to include more sports related tokens to the vocabulary.

In some embodiments, a relevance score is assigned to an article and content pair that provides a scoring of the similarity between the article and the content. A machine learning relevance model receives an article document vector and a content document vector as input and generates a relevance score for each article and content pair based on the similarity between the article document vector and the content document vector. In some embodiments, the relevance model is a common binary logistic regression machine learning model that is trained to output a relevance score for each article and content pair. For example, a relevance score is generated for Video A and Article A indicating that Video A and Article A are related. Another example may include a different relevance score is generated for Video B and Article A indicating that Video B and Article A are related. Another example may include a different relevance score is generated for Video B and Article B indicating that Video B and Article B are not related.

A list of predicted matches of media content related to the article may be generated based on the relevance score. In some embodiments, content is included as media content in the list of predicted matches if the relevance score indicates that the article and the content are related. A list of predicted matches may be generated for each article. In some embodiments, the list of predicted matches may include the media content ranked based on the relevance score. For example, the media content may be ordered with the relevance scores in a descending order with the highest scores at the top of the list (e.g., relevance scores indicating that the media content is more similar to the article as compared to other media content) and the lowest scores at the bottom of the list (e.g., relevance scores indicating that the media content is less similar to the article as compared to another media content).

One or more filters may be applied to the list of predicted matches to ensure that the media content is relevant to the article. For example, the one or more filters are used to ensure that the media content is describing the same event as the articles or describing the entities involved in the event and temporally close to the event. The filters may be used to remove media content from the list of predicted matches that is not describing the same event as the article and/or remove media content that is less relevant to the article as compared to other media content included in the list of predicted matches.

One example filter may include a relevance score filter to filter the list of predicted matches based on the relevance score. Another example filter may include a temporal proximity filter. The temporal proximity filter may identify a temporal event and link the article and the content to the event. The temporal proximity filter filters the list of predicted matches to ensure that the media content that remains on the list of predicted matches is recent or fresh as compared to the event in the article. As such, the temporal proximity filter may be used to ensure that the media content is for the same event reported in the article. For example, the temporal proximity filter evaluates a time difference between a publication date when the article is published and a date indicating when the media content is added to the content management system to determine whether the content is recent as compared to when the article published, or the content is old, or stale as compared when the article published.

Another example filter may include an entity filter to ensure that the article and the media content include one entity in common. The entity filter may be used to ensure that the media content is for the same event reported in the article. An entity extractor may extract entities mentioned in the article, such as, location names, sport team names, business names, and/or individual names. In some embodiments, if a match occurs between at least one entity mentioned in the article and at least one entity mentioned in the media content, the media content remains on the list of predicted matches. In some embodiments, if a match does not occur between at least one entity mentioned in the article and one entity mentioned in the media content, the media content is removed from the list of predicted matches. As such, the entity filter ensures that the article and the media content has at least one entity in common.

A final list of additional content may be generated for each article after filtering based on the machine learning model score, the date, and the entities. The final list of additional content may include the media content remaining on the list of predicted matches after the one or more filters are applied to the media content. For each article, a list of additional content may be mapped to the article. The list of additional content may be ranked based on the entities extracted and/or the categories. For example, additional content with more matches with the entities mentioned in the article may be placed higher on the list of additional content as compared to additional content with less matches with entities mentioned in the article. The final list of additional content may be stored in a datastore.

In some embodiments, one or more additional content from the list of additional content is presented along with the article. The additional content may be presented nearby or adjacent to the article. For example, the additional content is presented above the article, below the article, within the article, or next to the article.

In some embodiments, the final list of additional content is presented to a user through embedded content with the article when presented on a webpage. In addition, the final list of additional content may be provided to a content suggestion pipeline.

By selecting the domain specific language model based on the domain of the article and/or the content, other domain specific language models are not applied to the article and/or the content. Moreover, by performing a preliminary classification within the domain of the article and/or the content, the computation for identifying which articles and content are discussing the same topics is reduced by ignoring content that is classified differently from the articles. As such, instead of running document vectors on the whole article corpus, only document vectors for articles and content pre-identified as possibly discussing the same categories are generated by the domain specific language models.

Moreover, a pipeline of precomputed additional content associated with the article is stored in the datastore. The pipeline may be updated at predetermined times (e.g., every hour) by accessing the most recently published content and/or articles. Thus, each time the article is called or accessed by a webpage and/or accessed by other applications or users, the most recent list of additional content may be embedded with the article.

One technical advantage of the systems, devices, and methods is compute savings by only applying the domain language specific model for the domain of the articles. By identifying the domain upfront for the articles and/or the content, the pre-trained domain language specific model is selected for the article and/or the content based on the domain resulting in compute savings by only applying the domain language specific model for the domain of the articles and/or the content and not running other language models for other domains. Moreover, by classifying the articles and/or the content using the smart tags into different categories, the computation required for identifying which articles and/or the content may be similar is reduced by having a subset of the articles and/or content that is pre-matched based on the smart tags provided as input to the domain specific language model. As such, the domain language specific model performs processing on a portion of the articles and/or the content, resulting in compute savings by not processing all of the articles and/or the content.

Another technical advantage of the systems, devices, and methods is compute savings when loading the additional content in the article. By already having the additional content embedded with the article pane of the article, each time the article is called by a webpage, or accessed by a user, the additional content is already embedded within the article and is loaded with the article, resulting in compute savings.

(A1) Some embodiments include a method for automatically identifying additional content (e.g., content 38) for an article (e.g., article 10). The method includes identifying (302) a domain (e.g., domain 14) for the article. The method also includes identifying (304) an article type for the article using one or more domain-specific smart tags (e.g., tags 18) for the identified domain. The method further includes converting (312) at least a portion of the article into a document vector (e.g., vector 20) using a pre-trained domain specific language model (e.g., model 202) for the identified domain. The method also includes querying (316) a datastore (e.g., datastore 102, 206) using the document vector, where the datastore stores media content (e.g., content 12) having the identified domain and the identified article type. The method further includes obtaining (318) media content results (e.g., media content 28) in response to the querying, and ranking (322) the obtained media content results based on a temporal proximity to the event in the article and a relevance score (e.g., score 24) assigned by a relevance model (e.g., model 204). The method also includes, based on the ranking, storing (332) the article with at least one result of the obtained media content results (e.g., content 38) embedded with the article. The method further includes causing (334) the article and the at least one result of the obtained media content results to be presented to a user.

(A2) In some embodiments, the method of A1 includes converting (314) at least a portion of the media content into a content document vector using the pre-trained domain specific language model; training a relevance model to identify the media content that is similar to the article using the document vector and the content document vector; and generating (320) a relevance score for the media content and the article using the relevance model, where the relevance score indicates a similarity of content between the article and the media content.

(A3) In some embodiments of the method of A1 or A2, the temporal proximity is based on a difference between a publication date of the article and a date when the media content was published to the datastore.

(A4) In some embodiments, the method of any of A1-A3 includes filtering (324) the obtained media content results of the query based on entities mentioned in the article and comparing the entities in the article with at least one entity from the obtained media content results.

(A5) In some embodiments of the method of any of A1-A4, the ranking is in a descending order based on a number of entities in common between the article and the obtained media content results with a higher number of entities in common at the top of the ranking.

(A6) In some embodiments, the method of any of A1-A5 includes causing the article and the at least one result of the obtained media content results to be presented in response to a user requesting the article (e.g., via a browser).

(A7) In some embodiments of the method of any of A1-A6, the pre-trained domain specific language model is trained on a set of input text tailored to the domain.

(A8) In some embodiments of the method of any of A1-A7, the article is a text article (e.g., without any audiovisual component).

(A9) In some embodiments of the method of any of A1-A8, the at least one result is media content that shows the event described in the text article.

(A10) In some embodiments of the method of any of A1-A9, the at least one result is a video that aligns specifically with the text article. For example, the article describes a play in a football game and the video shows an interview with the coach about the play.

(A11) In some embodiments of the method of any of A1-A10, the at least one result is a voice recording. For example, the article describes a weather event, and the voice recording is of a weatherman describing details of the event.

(B1) Some embodiments include a method for identifying additional content (e.g., content 38) about an event in an article (e.g., article 10). The method includes receiving an identification of a domain (e.g., domain 14) for the article. The method also includes converting (312) at least a portion of the article into an article document vector (e.g., vector 20) using a pre-trained domain specific language model (e.g., model 202) for the domain, where the pre-trained domain specific language model is trained on a set of input text specific to the domain. The method includes converting (314) at least a portion of content (e.g., content 12) stored in a datastore (e.g., datastore 102, 206) into a content document vector (e.g., vector 22) using the pre-trained domain specific language model for the domain. The method includes generating a list of predicted matches (e.g., matches 26) using a relevance score (e.g., score 24) for the article document vector and the content document vector, where the relevance score indicates a similarity of content between the article and the content and is determined by a relevance model (e.g., model 204) and the list of predicted matches includes the content (e.g., media content 28) similar to the article. The method includes applying (324) at least one filter (e.g., filters 30, 32, 34, 36) to the list of predicted matches to filter the content based on temporal proximity to the event in the article. The method includes generating (326) a list of additional content (e.g., content 38) in response to applying the at least one filter to the list of predicted matches. The method includes storing (332) an association of the article and the list of additional content in a datastore. The method includes causing (334) the article and at least one of the additional content to be presented.

(B2) In some embodiments, the method of B1 includes receiving an article type for the article using one or more smart tags (e.g., tags 16) for the domain; receiving a content type for content stored in a datastore using the one or more smart tags (e.g., tags 18) for the domain; determining (308) whether a match occurs between the one or more smart tags for the article and the one or more smart tags for the content; providing the article and the content as input to the pre-trained domain specific language model in response to the one or more smart tags matching; and selecting (310) different content to compare to the article in response to the one or more smart tags not matching.

(B3) In some embodiments of the method of B1 or B2, filtering the content based on the temporal proximity further includes removing content from the list of predicted matches based on a difference between a publication date of the article and a date when the content was published to the datastore exceeding a threshold value.

(B4) In some embodiments of the method of any of B1-B3, the at least one filter further includes a relevance score filter to filter the list of predicted matches by removing content from the list of predicted matches based on the relevance score.

(B5) In some embodiments of the method of any of B1-B4, the at least one filter further includes an entity filter to filter the list of predicted matches by removing content from the list of predicted matches when at match does not occur between at least one entity discussed in the article and entities from the content.

(B6) In some embodiments, the method of any of B1-B5 includes automatically embedding the list of additional content in the article; and storing the article with the embedded list of additional content in the datastore.

(B7) In some embodiments, the method of any of B1-B6 includes displaying the article and the embedded list of additional content on a webpage in response to a user requesting the article (e.g., via a browser).

Some embodiments include a system (environment 100 or environment 200). The system includes one or more processors; memory in electronic communication with the one or more processors; and instructions stored in the memory, the instructions being executable by the one or more processors to perform any of the methods described here (e.g., A1-A11 and B1-B7).

Some embodiments include a computer-readable storage medium storing instructions executable by one or more processors to perform any of the methods described here (e.g., A1-A11 and B1-B7).

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for automatically identifying additional content about an event in an article, comprising:
   identifying a domain for the article;
   identifying an article type for the article using one or more domain-specific smart tags for the identified domain;
   converting at least a portion of the article into a document vector using a pre-trained domain-specific language model for the identified domain, wherein the pre-trained domain-specific language model converts the portion of the article into a numeric vector representation located within a vector space specific to the identified domain, and wherein the pre-trained domain-specific language model is trained on a set of input text tailored to the domain such that the pre-trained domain-specific language model learns to differentiate nuances in vocabulary words particular to the domain;
   querying a datastore using the document vector, wherein the datastore stores media content having the identified domain and the identified article type, and wherein the media content stored in the datastore is associated with numeric vector representations;
   obtaining media content results in response to the querying;
   ranking the obtained media content results based on temporal proximity of the media content to the event described in the article and on relevance scores assigned by a relevance model to the media content;
   generating a list of additional content, the list of additional content including the obtained media content results based on the ranking;
   embedding the list of additional content with the article;
   storing the article with the list of additional content embedded with the article;
   causing the article including the embedded list of additional content to be presented; and
   updating the list of additional content embedded with the article at a predetermined interval, the updated list based on the temporal proximity to the event described in the article and relevance scores assigned by the relevance model.

2. The method of claim 1, further comprising:
   converting at least a portion of the media content into a content document vector using the pre-trained domain-specific language model;
   training the relevance model to identify the media content that is similar to the article using the document vector and the content document vector; and
   generating the relevance scores for the media content using the relevance model, wherein the relevance scores indicate similarity between the article and the media content.

3. The method of claim 1, wherein the temporal proximity is based on a difference between a publication date of the article and a date when the media content was published to the datastore.

4. The method of claim 1, wherein the method further includes:

filtering the obtained media content results of the query based on entities mentioned in the article, the filtering including comparing the entities in the article with at least one entity from the obtained media content results.

5. The method of claim 4, wherein the ranking is in a descending order based on a number of entities in common between the article and the obtained media content results, with a higher number of entities in common at the top of the ranking.

6. The method of claim 1, wherein causing the article and the embedded list of additional content to be presented is in response to the article being accessed using a webpage.

7. The method of claim 1, wherein the article is a text article.

8. The method of claim 7, wherein the obtained media content results includes a media content result corresponding to media content that shows the event described in the text article.

9. The method of claim 7, wherein the obtained media content results includes a media content result corresponding to a video that aligns specifically with the text article.

10. The method of claim 1, wherein the obtained media content results includes a media content result corresponding to a voice recording.

11. A system, comprising:

one or more processors;

memory in electronic communication with the one or more processors; and instructions stored in the memory, the instructions being executable by the one or more processors to:

identify a domain for an article;

identify an article type for the article using one or more domain-specific smart tags for the identified domain;

convert at least a portion of the article into a document vector using a pre-trained domain-specific language model for the identified domain, wherein the pre-trained domain-specific language model converts the portion of the article into a numeric vector representation located within a vector space specific to the identified domain, and wherein the pre-trained domain-specific language model is trained on a set of input text tailored to the domain such that the pre-trained domain-specific language model learns to differentiate nuances in vocabulary words particular to the domain;

query a datastore using the document vector, wherein the datastore stores media content having the identified domain and the identified article type, and wherein the media content stored in the datastore is associated with numeric vector representations;

obtain media content results in response to the querying;

rank the obtained media content results based on temporal proximity of the media content to an event described in the article and on relevance scores assigned by a pre-determined relevance model;

generate a list of additional content, the list of additional content including the obtained media content results based on the ranking;

embed the list of additional content with the article;

store the article with the list of additional content embedded with the article;

cause the article including the embedded list of additional content to be presented; and update the list of additional content embedded with the article at a predetermined interval, the updated list based on temporal proximity to the event described in the article and relevance scores assigned by the relevance model.

12. The system of claim 11, wherein the instructions are further executable by the one or more processors to:

convert at least a portion of the media content into a content document vector using the pre-trained domain-specific language model;

train the relevance model to identify the media content that is similar to the article using the document vector and the content document vector; and generate the relevance scores for the media content using the relevance model, wherein the relevance scores indicate similarity between the article and the media content.

13. The system of claim 11, wherein the instructions are further executable by the one or more processors to filter the obtained media content results of the query based on entities mentioned in the article, the filtering including comparing the entities in the article with at least one entity from the obtained media content results, wherein the ranking is in a descending order based on a number of entities in common between the article and the obtained media content results, with a higher number of entities in common at the top of the ranking.

14. The system of claim 11, wherein the article is a text article and the obtained media content results includes a media content result corresponding to media content that shows the event described in the text article or a video that aligns specifically with the text article.

15. A method for identifying additional content about an event in an article, comprising:

receiving an identification of a domain for the article;

converting at least a portion of the article into an article document vector using a pre-trained domain-specific language model for the domain, wherein the pre-trained domain-specific language model is trained on a set of input text specific to the domain, and wherein the pre-trained domain-specific language model converts the portion of the article into a numeric vector representation located within a vector space specific to the identified domain, and wherein the pre-trained domain-specific language model is trained on a set of input text tailored to the domain such that the pre-trained domain-specific language model learns to differentiate nuances in vocabulary words particular to the domain;

converting at least a portion of content stored in a datastore into a content document vector using the pre-trained domain-specific language model for the domain, wherein the pre-trained domain-specific language model converts the portion of the content into an additional numeric vector representation located within the vector space specific to the identified domain;

generating a list of predicted matches using a relevance score for the article document vector and the content document vector, wherein the relevance score indicates a similarity between the article and the content and is determined by a relevance model and the list of predicted matches includes the content similar to the article;

applying at least one filter to the list of predicted matches to filter the content based on temporal proximity to the event described in the article;

generating a list of additional content in response to applying the at least one filter to the list of predicted matches;

storing the article with the list of additional content in a datastore;

causing the article and the list of additional content to be presented, the list of additional content embedded with the article; and updating the embedded list of additional content at a predetermined interval, the updated list based on temporal proximity to the event described in the article and relevance scores assigned by the relevance model.

16. The method of claim 15, further comprising:

receiving an article type for the article using one or more smart tags for the domain;

receiving a content type for content stored in a datastore using the one or more smart tags for the domain;

determining whether a match occurs between the one or more smart tags for the article and the one or more smart tags for the content;

providing the article and the content as input to the pre-trained domain-specific language model in response to the one or more smart tags matching; and selecting different content to compare to the article in response to the one or more smart tags not matching.

17. The method of claim 15, wherein filtering the content based on the temporal proximity further includes removing content from the list of predicted matches based on a difference between a publication date of the article and a date when the content was published to the datastore exceeding a threshold value.

18. The method of claim 15, wherein the at least one filter further includes at least one of:

a relevance score filter to filter the list of predicted matches by removing content from the list of predicted matches based on the relevance score, or an entity filter to filter the list of predicted matches by removing content from the list of predicted matches when a match does not occur between at least one entity discussed in the article and entities from the content.

19. The method of claim 1, further comprising:

embedding with the article, the additional content associated with the list of additional content; and storing the embedded additional content with the article.

\* \* \* \* \*